FIG. 1

INVENTOR.
LEONARD FRIEDMAN

Aug. 11, 1970          L. FRIEDMAN          3,523,855

MACHINE FOR MAKING FRAME MOUNTINGS FOR TRANSPARENCIES

Filed Jan. 24, 1968          7 Sheets-Sheet 2

INVENTOR.
LEONARD FRIEDMAN

BY

ATTORNEY

Aug. 11, 1970   L. FRIEDMAN   3,523,855
MACHINE FOR MAKING FRAME MOUNTINGS FOR TRANSPARENCIES
Filed Jan. 24, 1968   7 Sheets-Sheet 4

INVENTOR.
LEONARD FRIEDMAN
BY
ATTORNEY

Aug. 11, 1970 — L. FRIEDMAN — 3,523,855
MACHINE FOR MAKING FRAME MOUNTINGS FOR TRANSPARENCIES
Filed Jan. 24, 1968 — 7 Sheets-Sheet 6

INVENTOR.
LEONARD FRIEDMAN
BY
ATTORNEY

United States Patent Office 3,523,855
Patented Aug. 11, 1970

3,523,855
MACHINE FOR MAKING FRAME MOUNTINGS
FOR TRANSPARENCIES
Leonard Friedman, New York, N.Y., assignor to Filmways, Inc., New York, N.Y., a corporation of Delaware
Filed Jan. 24, 1968, Ser. No. 700,281
Int. Cl. B32b *31/08, 31/06;* B31f *7/00*
U.S. Cl. 156—514
9 Claims

ABSTRACT OF THE DISCLOSURE

Machine for preparing transparency or film frame mounting cards in which cardboard is fed in at one side of the machine and then is successively given a central fold line and then is successively slit, given a central folding score line, printed, punched, laminated on one side, heat-sealed, round punched, and finally rectangularly punched so as to form a frame capable of being folded on to a transparency which is to be preserved in review.

DESCRIPTION OF THE INVENTION

The present invention relates to a process and machine for making paper mounting frames for transparencies and it particularly relates to a frame for mounting color transparencies.

It is among the objects of the present invention to provide a continuous machine which will take a strip of thin foldable cardboard and by successive operations form it into a double frame which can be folded on to a transparency.

Another object is to provide a novel process and machine for making film slides in which a strip of paper is substantially subjected to slitting, cutting, printing and punching operations, with the resultant production of frames to be attached to or to hold and receive film transparencies.

Still further objects and advantages will appear in the more detailed description set forth below, it being understood, however, that this more detailed description is given by way of illustration and explanation only and not by way of illustration and explanation only and not by way of limitation, since various changes therein may be made by those skilled in the art without departing from the scope and spirit of the present invention.

According to the present invention, the strip of paper supplied in the form of a roll has relatively flexible single or double ply cardboard.

The first operation consists of slitting the strip to size. Then the central portion of the strip is scored centrally and longitudinally so that the frames, when cut off, may be folded.

Then the paper may be elevated or lowered out of the direct line of flow so as to be printed, preferably by means of rubber printing rollers, and one or more printing operations may take place, together with the ink drying operations.

After the printing operations, each side of the strip is provided with a circular punch hole, following which one side is provided with a lamination or additional sheet which is superimposed upon the inside face of what is to be the frame. This additional sheet is heat-sealed at its periphery to one side of the strip and is then die-cut so as to remove a rectangular portion thereof directly above and beside the circular punch.

This will form a pocket for the transparency between the additional lamination and the base sheet. Then rectangular portions are removed from both sides of the strip of each side of the fold line so as to form a through window. Then the frames are cut off from the main strip and displaced downwardly to be collected on a collector below. This will produce a complete folding frame with a pocket for receiving the transparency.

BRIEF DESCRIPTION OF DRAWINGS

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
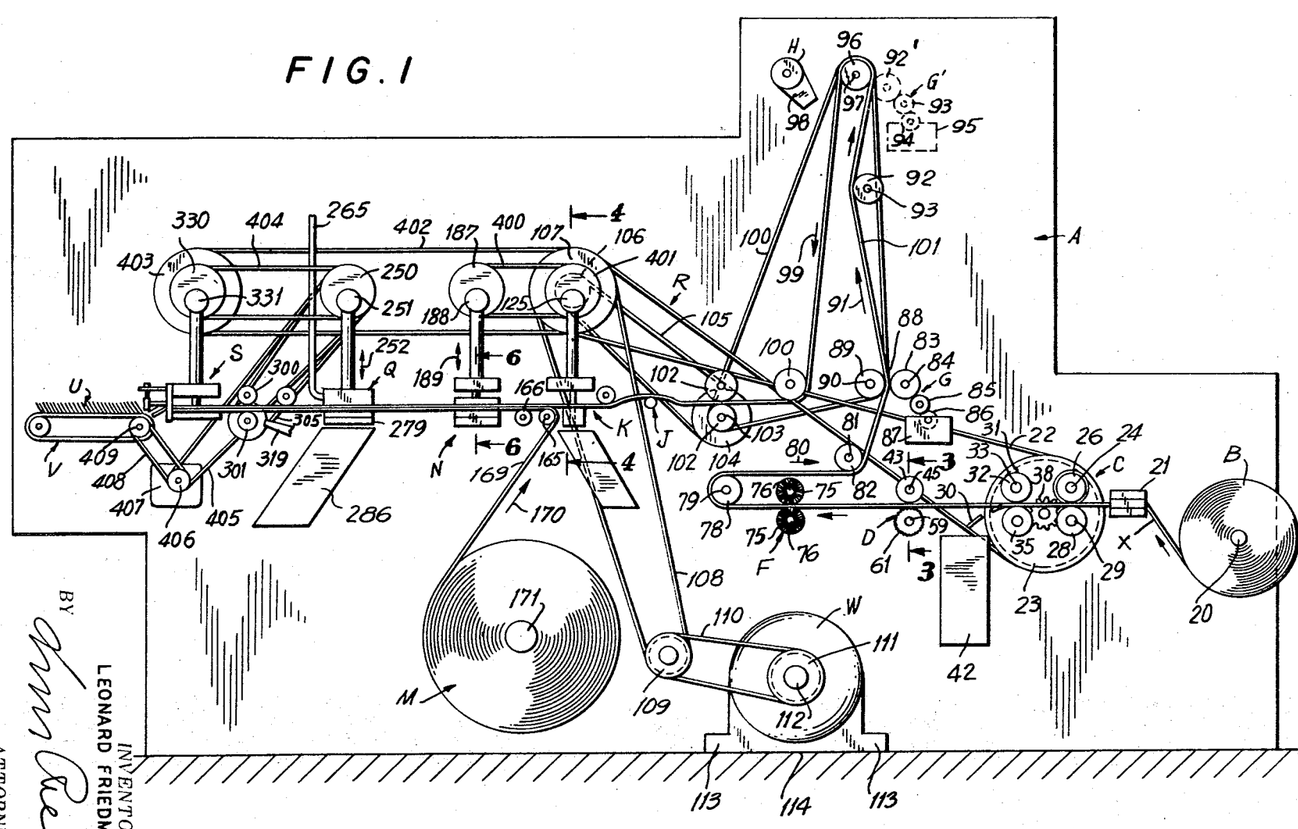
FIG. 1 is a diagrammatic side elevational view of a machine according to the present invention for forming the folding frames.
Figure 2:
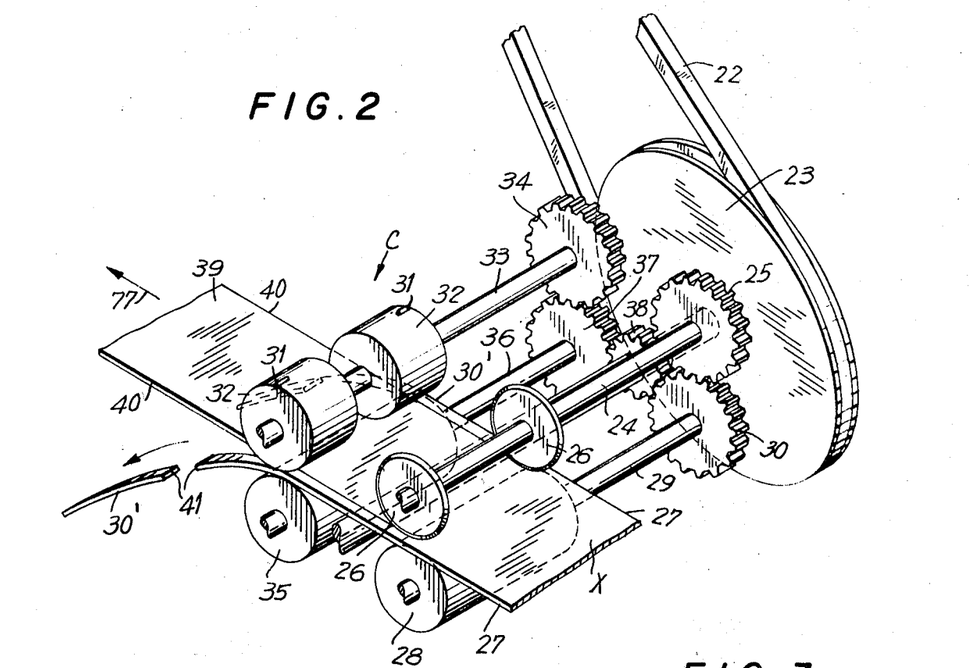
FIG. 2 is a fragmentary perspective view showing the initial cutting and slitting operation.

Referring to FIG. 1, the frame A of the machine diagrammatically indicated carries the roll of cardboard which is fed to a sizer and slitter C shown in greater detail in FIG. 2. In FIG. 2 the strip of cardboard is trimmed to size. Then the strip is passed to the scorer and slitter D shown in greater detail in FIG. 3. The strip, after trimming, scoring and slitting, is indicated at E in FIG. 3a.

The strip is then brushed on both sides at F to remove any lint or loose fragments of cardboard. The strip is then elevated and printed at G, preferably by a rubber print roller. A second printer is indicated at G′ if required, followed by a hot air blower H to dry the ink.

Figure 4:
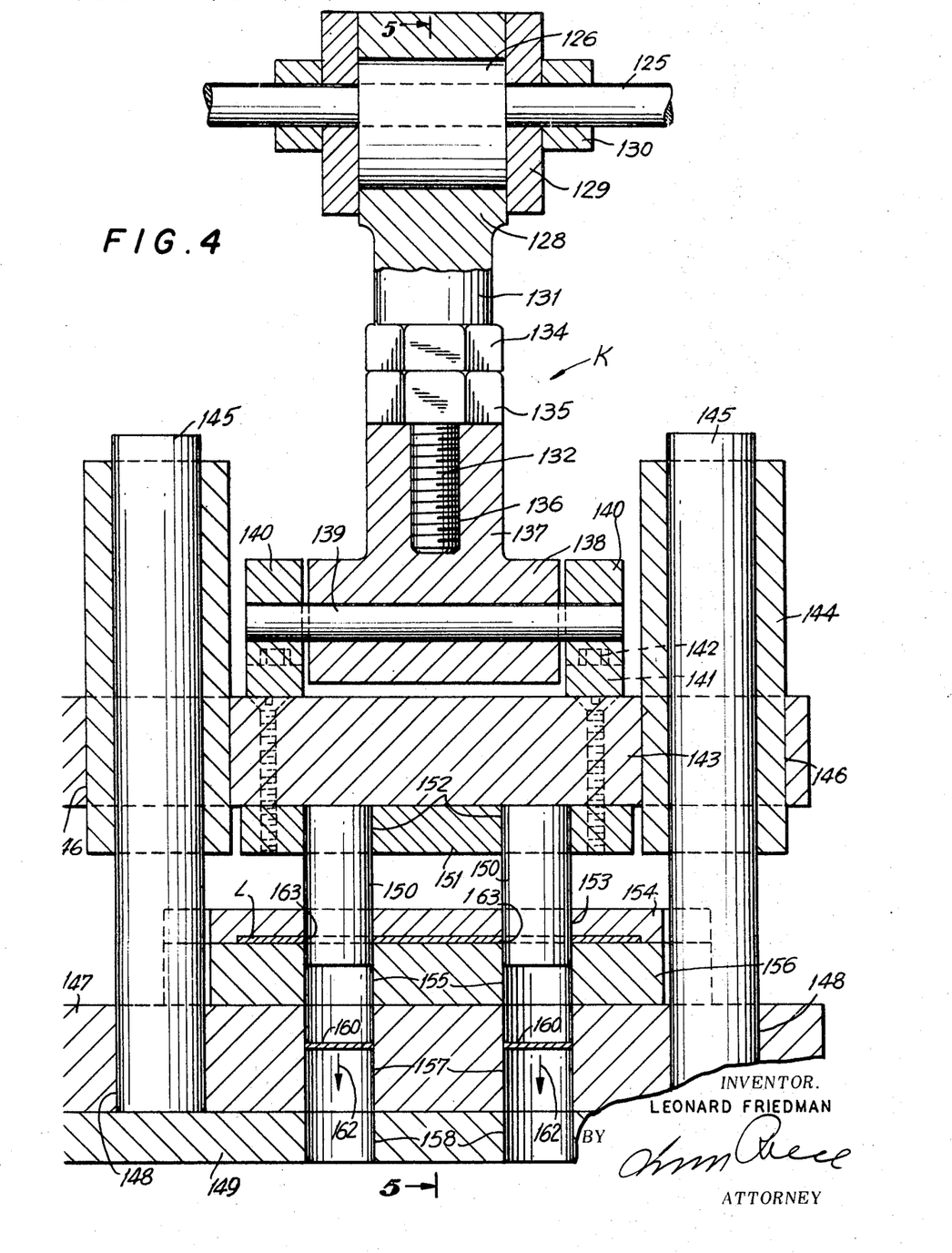
FIG. 4 is a transverse vertical sectional view showing the mechanism at the two hole punch operation.
Figures 5, 5A:
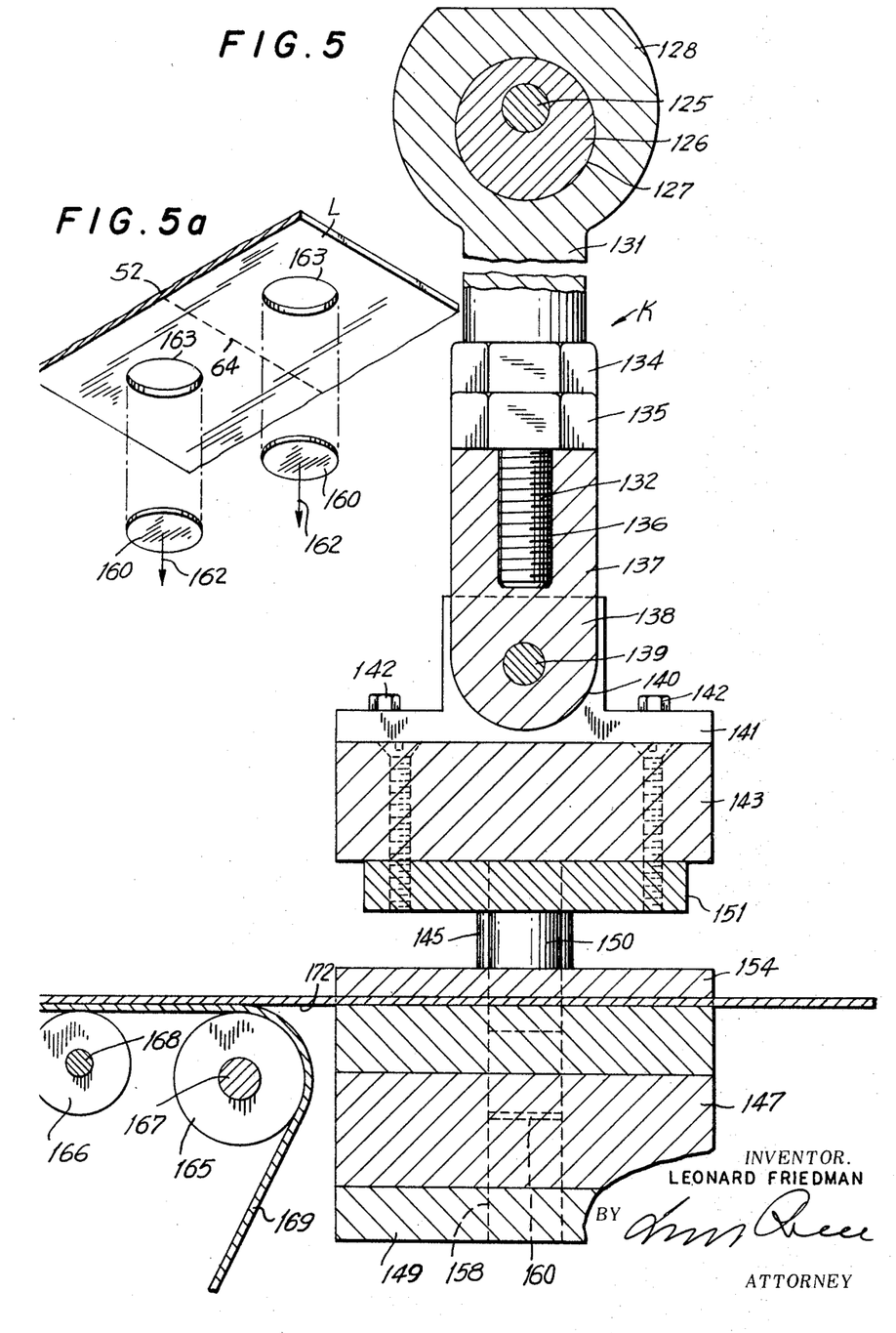
FIG. 5 is a transverse vertical sectional view upon the line 5—5 of FIG. 4, showing the double hole punch arrangement.
FIG. 5a is a fragmentary diagrammatic perspective view showing the punching of the strip.

The strip is then buckled at J and passed under the double puncher or two hole puncher K, which is shown in greater detail in FIGS. 4 and 5. The strip at this time will have two circular openings punched out on each side of the center line, as indicated at L in FIG. 5a. Then the laminating strip from the roller M is fed under the strip to the sealer N, which is shown in greater detail in FIG. 6.

Figure 6:
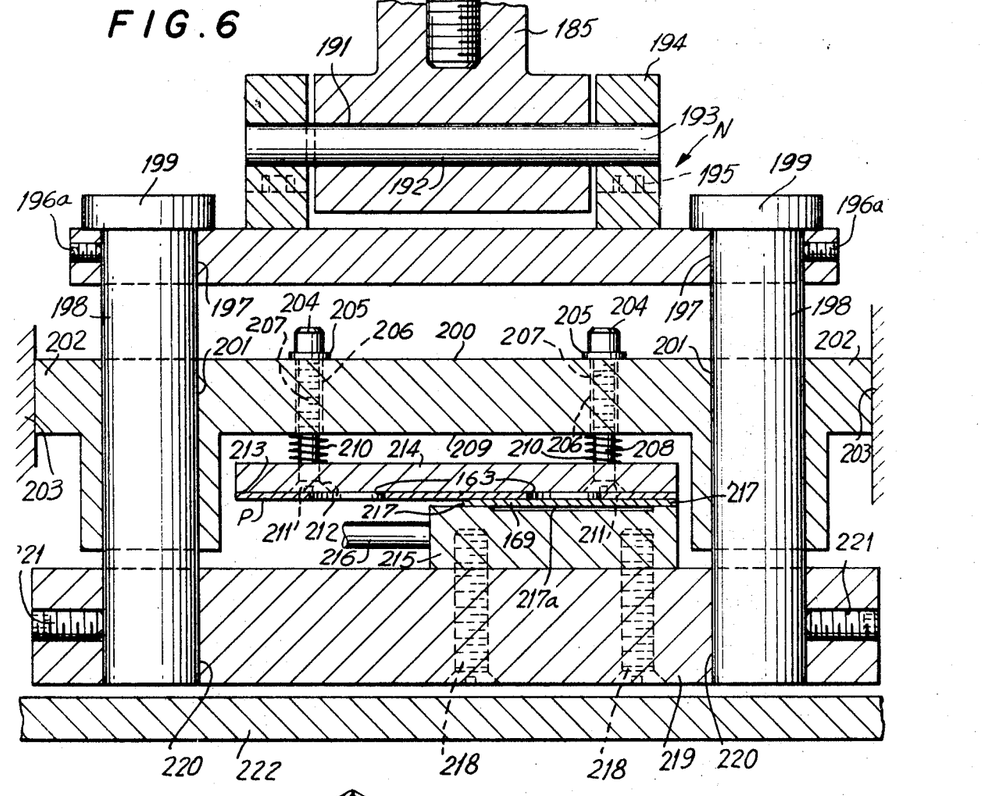
FIG. 6 is a fragmentary vertical transverse sectional view taken upon the line 6—6 of FIG. 1 showing the sealing operation.
Figure 6A:
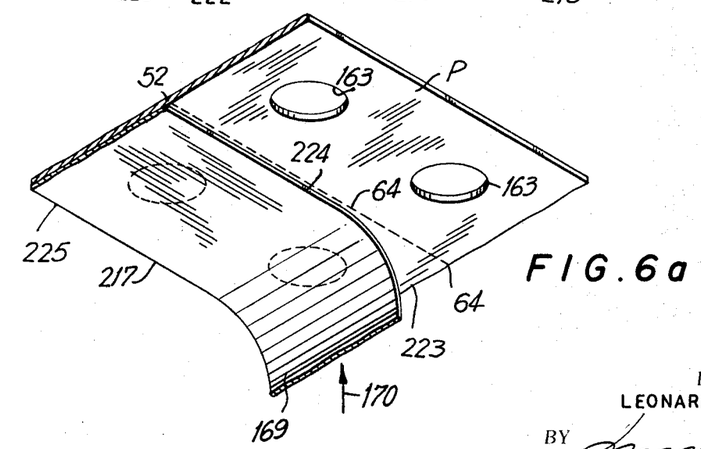
FIG. 6a is a diagrammatic fragmentary perspective view showing the manner in which the extra sheet is laminated onto one side of the strip.

The strip, after lamination and sealing, will appear as indicated at P in FIG. 6a. The strip is then diecut at Q to remove a rectangular portion of the laminated strip, as is shown in greater detail in FIG. 7, giving the form as indicated at R in FIG. 7a. Finally, the sheet is passed through the rectangular punch S, where both sides are cut out rectangularly to form the inner edges of the frame, as indicated at T in FIG. 8a. The final folded frame, after cutting, is then deposited at U in FIG. 8 upon the belt V. The drive motor W will drive the various belts and chains which drive the various mechanisms, C, D, F, G, G', K, N, Q, S and V.

Referring to FIG. 1, the roll of cardboard which is to be supplied to the various cutting and laminating operations is carried on the axle or spindle 20 which may be replaced and passes through the guide member 21 into the mechanism C which slits the edges to proper size. This mechanism is shown in greater detail in FIG. 2. In FIG. 2 the drive belt 22 drives the pulley 23, which is connected to the shaft 24. On the pulley 23 is mounted the gear 25 on the shaft 24. This shaft 24 carries the circular slitters 26 on each side 27 of the strip X, after it has passed the guide 21.

These circular knives or slitters 26 will press against a backing roller 28 on the shaft 29, driven through the gear 30 which meshes with the gear 25. As a result of this slitting operation, the waste strips 30' will be removed from the sides of the main strip X and will be cut in short lengths by the cutters 31 on the rollers 32 which rotate on the shaft 33 driven by the gear 34.

These cutters 31 will cut against the backing roller 35, which is driven by the shaft 36 from the gear 37, which meshes with the gear 34. The intermediate gear 38 meshes with the gear 30 to drive the gears 37 and 34 on the shafts 33 and 36. The strip X will be trimmed to somewhat smaller size at 39, with the edges 40 constituting the edges of the final folded frame. The cutters 31 will prevent too great a length accumulating of the slit off portions 30, so that the slit 30 will be cut into small sections, as indicated at 41, and deposited in the waste bin 42 of FIG. 1.

Figure 3:
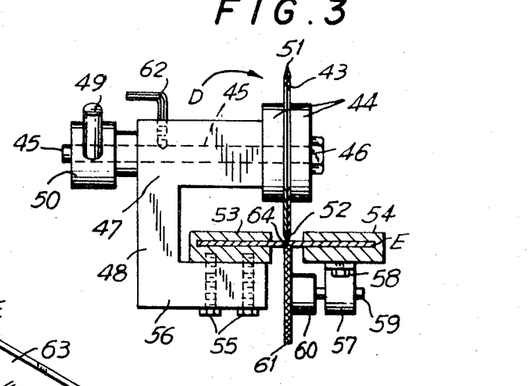
FIG. 3 is a transverse sectional view upon the line 3—3 of FIG. 1, showing the scoring and slitting arrangement.

Next the center is scored and slitted at the position D by the mechanism shown in FIG. 3. In FIG. 3 is shown a non-rotating cutting wheel 43 which is held in position between the two clamps 44 and the bolt 45, having the hexagonal head 46 and extending through the upper leg 47 of the U-shaped racket member 48. The handle 49 in the head or cap 50 fixed to the shaft 45 may be used to raise or lower the knife edge 51 and regulate the depth of the cut 52 in the strip E.

The strip in the scorer and slitter of FIG. 3 will pass between the guide blocks 53 and 54. The guide block 53 is mounted by the screws 55 upon the lower leg 56 of the U-member 48, while the guide block 54 carries a bearing 57 by the belt 58, which has a rotating shaft 59 extending to the hub 60 having the knurled rotating wheel 61 which rotates against the cardboard, securing the bottom side thereof opposite the cut 52. The adjustment of the depth of the cut may be fixed after such adjustment by the set screw 62.

Figure 3A:
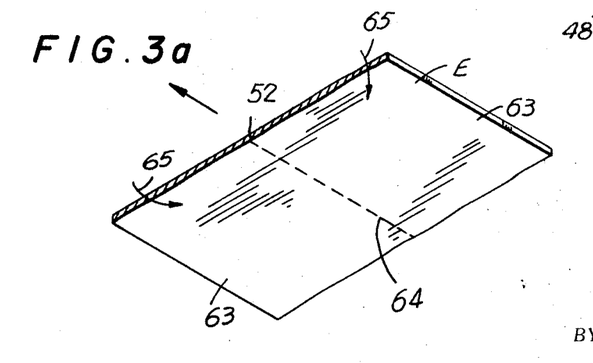
FIG. 3a is a fragmentary perspective view of the strip at the stage after its sides have been slit off and the central portion has been scored.

After the heating and scoring, the strip will appear as in FIG. 3a with two side sections 63, which on one side will be scored as indicated at 64 by the serrated or knurled rotating wheel and with the cut 52 on the upper side, the depth of which may be varied by the fixed heating wheel 51. In other words, the provision of the scoring 64 and the slitting 52 will enable the final frame to be folded in the direction indicated by the curved arrows 65 to enclose the transparency. As shown in FIG. 1, the brushes 75 on the shaft 76 are applied to both sides of the strip of FIG. 3a to remove any lint or dust or small pieces of stock which may have resulted from the stripping, slitting or scoring operations.

The rollers 32, in combination with the bottom roller 35, will press the strip forward through the scorer and slitter of FIG. 3, as well as the brushes 75 of FIG. 1 in the direction indicated at 77 in FIG. 2. The strip then passes over the roller 78 in FIG. 1 on the shaft 79 and then reverses its direction, as indicated at 80. It then passes over the guide roller 82 on the shaft 81 and will pass between the printing roller 83 on the shaft 84, which may be a rubber printing roller or of other constructions.

The printing roller 83 will be inked by the intermediate roller 85 from the roller 86, which rotates in the ink reservoir 87.

The strip at 88 is pressed against the printing roller 83 by the backing roller 89 on the shaft 90. The strip then ascends, as indicated at 91, to pass over the tensioning roller 92 on the shaft 93, and it may be again printed in a different color or in a second operation by the second printing roller 92' with the intermediate inking roller 93 and the lowermost roller 94 rotating in the ink reservoir 95.

The strip will then pass over the top roller 96 on the shaft 97 and be subjected to the action of the hot air blower H, the nozzle 98 of which will dry the ink. A nozzle such as H may also be positioned on the opposite side, directly above the printing roller 83. The strip, after printing then passes downwardly, as indicated at 99 under the guide roller 100.

These various rollers 89, 92, 96 and 100 may be driven by the belt or chain 101, which in turn is driven by the pulley or sprocket on the shaft 103. This pulley or sprocket is driven by the large pulley or sprocket 104, which in turn is driven by the belt or chain 105 from the pulley 106, forming part of the double punch device arrangement shown at position K. The rollers 102 will serve to feed the strip forwardly after it has moved down from the printing operation indicated at G and G'.

The pulley or sprocket 106 is driven by the large pulley or sprocket 107, which is connected by the belt or chain 108 to the intermediate pulley or sprocket 109. This sprocket 109 is driven by the pulley 110 from the pulley 111 on the shaft 112 in the motor W. The motor W is mounted by the base 113 on the floor or support structure 114. The double punch construction is best shown in FIGS. 4 and 5. The drive shaft 125 extends through the eccentric 126, which turns within the opening 127 of the bearing eye 128.

The eccentric is held in position between the side plates 129 and the collars 130. From the eye 128 extends downwardly the shank 131 having the threaded extension 132 held in adjusted position by the nuts 134 and 135. The threaded extension 132 extends into the threaded portion 136 of the neck 137 having the eye 138 through which extends the bearing 139. The bearing rod 139 is positioned between the side bearing elements 140 having the extended base 141 and the bolts 142. The bolts 142 are mounted upon the upper press element 143. This press element carries the sleeves 144, which reciprocate on the shafts 145. These sleeves fit in the opening 146 in the ends of the bearing element 143. The vertical guide shafts extend down to the base 147 and they are fixed in the openings 148 in said base, which rests upon the plate 149.

Reciprocating punches 150 extend into and are mounted in the plate 151 in the openings 152. These punches 150 reciprocate through the openings 153 in the upper guide block 154 and through the openings 155 in the lower guide block 156. These openings are continued at 157 in the base 147 and 158 in the lowermost plate 149, so that the cut portions 160 may be discharged as indicated by the arrows 162 within the machine.

As shown in FIG. 5a the strip L having the longitudinal score marks 64 and the partial cut 52 now is provided with openings 163 after the discs 160 have been removed and discharged in the direction of the arrows 162. As indicated in the lower part of FIG. 5, the strip L will then pass over the rollers 165 and 166 on the shafts 167 and 168 and it will be laminated with the strip 109 on one side thereof.

This strip 169 is fed upwardly as shown in FIG. 1 as indicated by the arrow 170 from the roll M, which is carried on the shaft 171. The sheet is next heat-sealed around its edges to the back 172 of the strip L, which preferably carries a heat-fusible or heat-activatable adhesive. This is accomplished at position N by the device shown in FIG. 6. As shown in FIG. 6, the drive is through the member 185 through the threaded bolt 186, which may be of the same type as indicated by the upper part of FIG. 5. As indicated diagrammatically in FIG. 1, there is a main drive element 187 with the eccentric 188 which affects the upward and downward actuation, as indicated by the double arrow 189. The eye-member 190 has an opening 191 through which extends the shaft 192. The ends 193 of the shaft 192 are mounted in the bearings 194 which are held down by means of the bolts 195 to the member 196.

The member 196 has the side openings 197 through which extend the cylinder posts 198, which have the top enlargements 199. These posts 198 are fixed to the plate 196 by the set screw 196a. The posts 198 will slide through the opening 201 in the fixed plate member 200. The fixed plate member 200 has the side extensions 202 to the side frame members 203. The lower ends of the posts 198 are fixed in the openings 220 by the set screws 221, which project through the sides of the plate 219. The plate 200 is provided with the bolt members 207 which extend through the openings 206 and have the upwardly extending portions 204 with the washers or collars 205. These openings 206 receive the threaded portions 207 extending downwardly from the heads 204. The bolts 207 project at 208 below the lower face 209 of the plate 200 and receive the coil spacer springs 210.

The heads 211 of the bolts 207 are recessed at 212 into the lower face 213 of the pressure plate 214. The strip P of FIG. 6a will pass under the lower face of the pressure plate 214 and above the electrically heated recessed plate 215, above which will be the laminating sheet 169. The laminating sheet 169 will be subjected to heating through the electric connection 216 adjacent the periphery 217 thereof and below the opening 163.

The heating plate 215 will reciprocate upwardly and downwardly with the posts 198 with the recess 217a leaving the central portion of the laminating sheet unaffected.

This heating plate 215 is held in position by the bolts 218, which extend through the base plate 219 having the openings 220, mounted on the shaft 198 and held in position by the set screws 221.

The plate 219 will be supported on the base plate 222. As shown in FIG. 6a, the laminating strip 169 will be applied only to one side 223 of the strip P, slightly spaced at 224 inside of the score line 64, and the outer edges will coincide, as indicated at 225.

The heat-seal will be adjacent the peripheral side edges 217 so as to permit the cut-out of a square or rectangular portion of the laminating strip 169. The rectangular cut-out is achieved at position Q by a reciprocating member which is actuated by the driving element 250 having the eccentric 251 with the reciprocation 252. This driving element is of similar structure, as shown in the upper part of FIG. 5 and it has a downwardly extending bolt connection 253 extending into the member 254 having a connection to the transverse shaft 255 in its lower portion 256.

Figure 7:
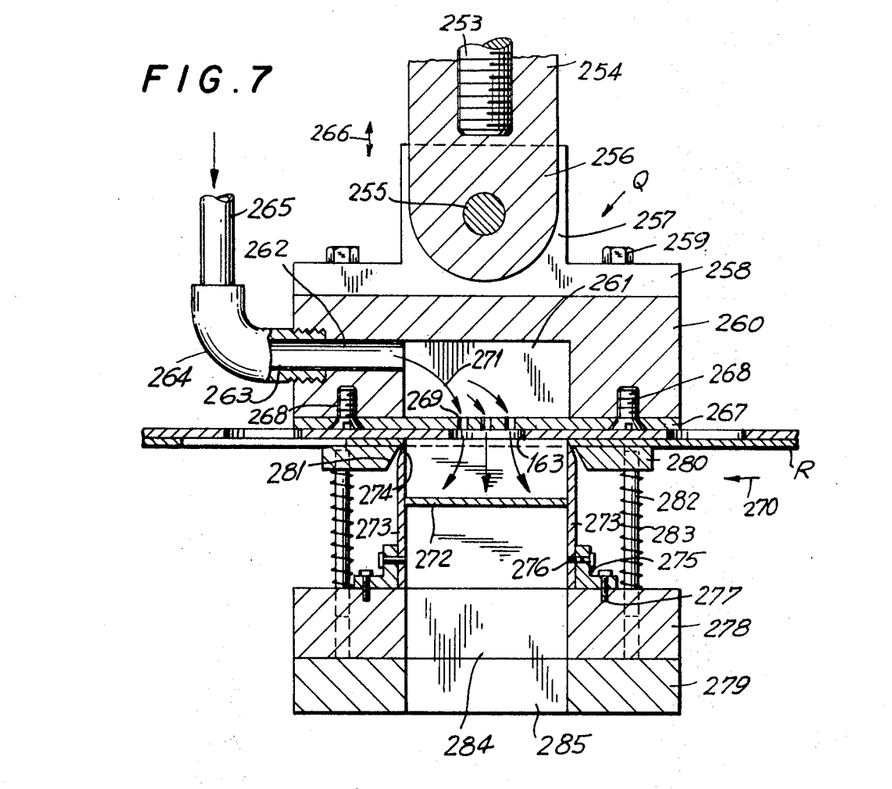
FIG. 7 is a vertical transverse sectional view showing the operation of removing the cut-out rectangular portions of the lamination.

The eye-member 256 will extend between the sides 257 of the bearing structure 258, which is held down by the bolts 259 on the support structure 260. The support structure 260 has a central pressure chamber 261 to which air under pressure is admitted through the bore 262 from the passageway 263 in the elbow 264 and the air pressure connection 265, which may be flexible so as to permit the upward and downward movement 266.

To the bottom of the member 260 is attached the contact plate 267, held in position by the screws 268. This plate is provided with openings 269, which will be directly above the opening 163, as the strip R is moved successively in the direction 270. These openings 269 will introduce air pressure or a blast of air in the chamber 261, as indicated by the arrows 271, so as to dislodge and remove the rectangular cut-out 272. The cutting mechanism consists of the blades 273 having the top cutting edges 274 which are mounted by means of the angle members 275 and the screws 276 and 277 upon the block or plate 278, which is in turn mounted upon the lower plate 279.

The framing member 280 has the oblique inside edges 281 encircling the blades 273 and held in position by means of the slide rods 282 which are encircled by the coil spring 283. The opening inside of the vertical blades 273 is continued by the openings 284 and 285 so that the cut-out 272 may be discharged downwardly into the waste bin 286, as shown on FIG. 1.

Figure 7A:
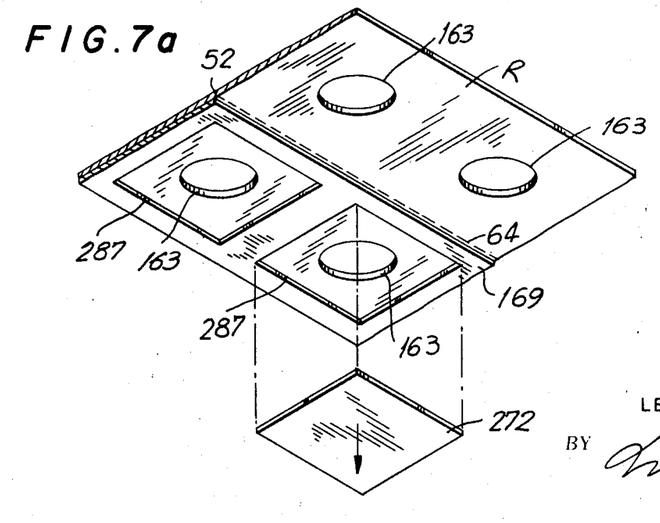
FIG. 7a is a fragmentary perspective view showing the removal of the rectangular frame cut-outs.

Referring to FIG. 7a, the strip R, which now has the attached lamination 169, will have each opening 163 exposed by a cut-out 272, which leaves the inside frame 287 in which the transparency is lodged. By first making the round cut-outs 163 it is possible to size and fix the positions of the various openings or cut-outs so that there will be certain location of the openings and so that there will not be a deformation of the strip in any position as it proceeds to the final operation.

Figures 8, 8A:
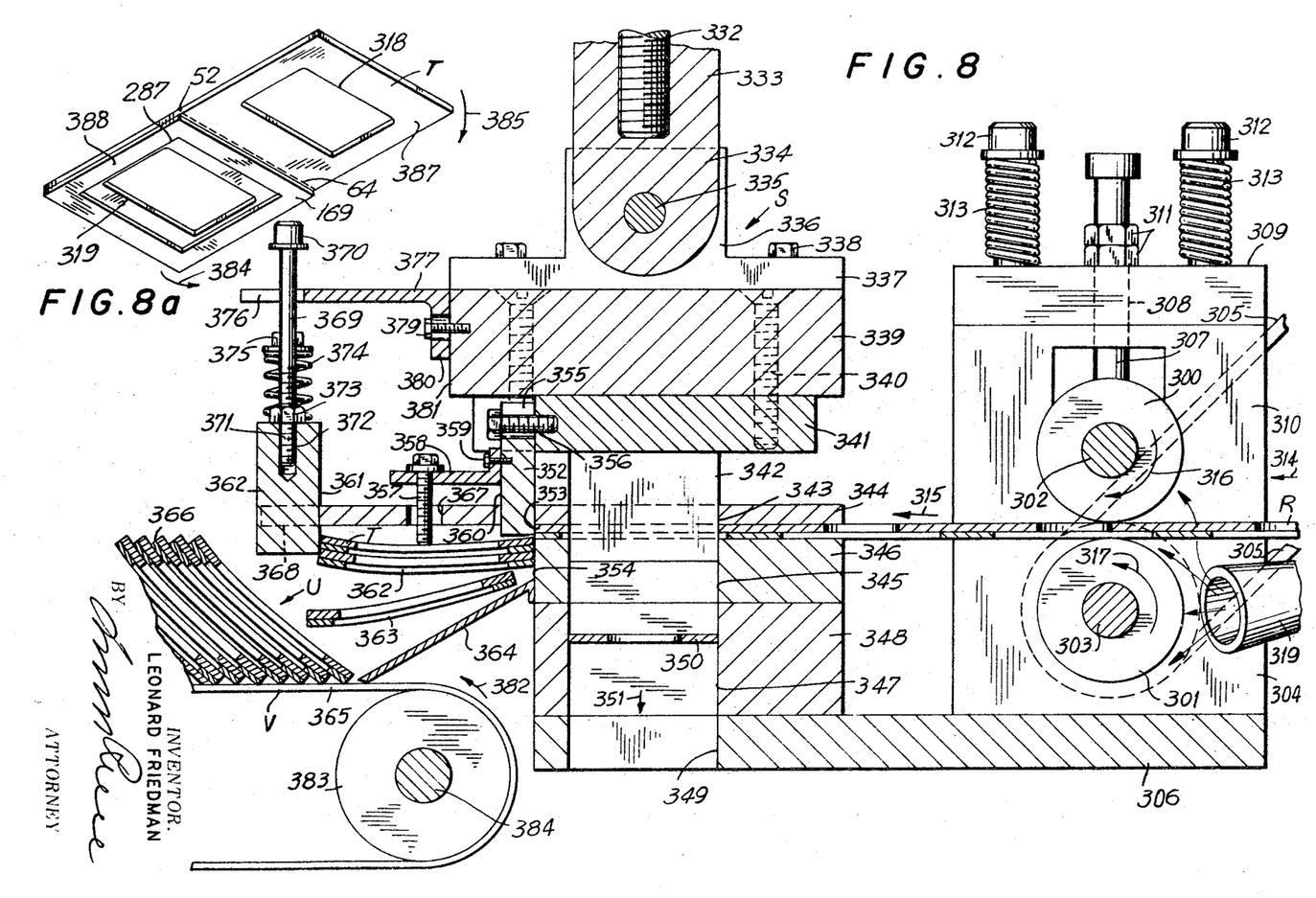
FIG. 8 is a transverse vertical sectional view showing the final punching operations.
FIG. 8a is a diagrammatic perspective view showing the final frame, ready for receiving a transparency and to be folded to enclose the transparency.

The last operation, which consists of cutting out the rectangular windows in the main strip R and then cutting off the successive frames, is shown in small scale at S in FIG. 1 and in large scale in FIG. 8. At the right of FIG. 8 is shown the pressure pull rolls 300 and 301, which press upon the strip R. These pressure pull rolls turn on the shafts 302 and 303.

The shaft 303 of the lower roller 301 is mounted in the block 304 and is driven by the belt 305. This block 304 is mounted on the base plate 306. The shaft 302 of the upper roller 300 is pressed down by means of the pressure rods 307, which extend at 308 through the top block 309, which covers the lower block 310. This rod 307 carries the adjustment nuts 311. The top block 309 carries the headed rod members 312, which in turn carry the pressure springs 313.

These springs will cause the rollers 300 and 301 to grip the strip R and pull it through the preceding operations in the direction of the arrow 314 and then force it forward in the direction of the arrow 315. The rollers 300 and 301 will turn in the directions 316 and 317, turned by the belt 305, and thus drag the strip through the entire machine. The pressure rollers 300 and 301 are subjected to the blower 319 for cooling and removing any residue from prior cutting or forming operations. The blower will be directed to blow slightly below the contact point and will also serve to cool the rollers 300 and 301.

The strip at 315 then progresses to the final cut-out operation, where the rectangular exposure frames 318 and 319 will be punched therein. This rectangular puncher arrangement is best shown at the left of FIG. 8 and it will punch both sides.

In the double rectangular frame cut-out operation, as indicated at S, the drive may be through the member 330 with the eccentric 331, and the structure may be as already shown at the top of FIG. 5. (See also FIG. 1.) The threaded connecting member 332 will be connected to the depending bar 333, which has an eye 334 carrying the shaft 335. The eye 334 will extend between the bearing members 336, the outwardly extending flanges 337 of which are held in position by the bolts 338. The base member 339, by the screws or bolts 340, carries the lower plate 341, which in turn carries the rectangular cut-out 342. This cutting member reciprocates through the guide opening 343 in the top plate 344 and the opening 345 in the bottom plate 346. This opening extends at 347 through the support member 348 and at 349 through the base plate 306.

The cut-out 350 will fall through the openings 345, 347 and 349, as indicated by the arrow 351, and it will fall into a suitable waste paper bin, not shown. At the same time on the front of the plate member 341 is mounted the separator cutter 352, the cutting edge 353 of which will reciprocate against the face 354 to separate the elements T as shown in FIG. 8a. This cutter is adjustably mounted by means of the slot 355 and the screw 356. The cutter member or separator member 352 also carries the adjustable threaded pusher member 357, which is mounted on the platform or plate 358.

This platform is mounted by the screw 359 on the face 360 of the cutter 352. This pusher member 357 will contact the folding frame between the windows 318 and 319 and press it downwardly between the face 354 and the face 361 of the spacer element 362. The space between the faces 360 and 361 will be somewhat less than the width of the element T in the direction of movement and therefore the successive cut off double frames T will be bowed downwardly, as indicated at 362, and successively released, as indicated at 363, whereupon they will contact the solid plate 364 and be picked up by the top face 365 of the belt V.

This pusher 357 is spaced more closely to the cutting edge 353 so that the cut-off frames 362 and 363 will tend to stack obliquely upwardly and forwardly, as indicated at 366. It will be noted that this pusher member 357 projects through the opening 367 in the plate 368 and will carry the spacer element 362. The spacer element 362 has an upwardly extending bolt member 369 with a head 370, the lower threaded end 371 of which is threaded into the opening 372 in the spacer block 362.

The height of the rod or bolt 369 may be varied by the nut 373, and above the nut 373 the rod 369 carries a stop spring 374, which has a contact head member 375. The bolt 36 will project upwardly through the slot 376 in the plate 377, which is mounted by the screw 379 and the flange 380 on the face 381 of the block 339. The plate 377 on each side of the slot 376 will contact the head member 375 and slightly compress the spring 374, acting as a buffer or stop for the cutting operation.

The cut unfolded double frames then are carried in the direction 382 by the top 365 of the belt B, which is turned by the pulley 383 on the shaft 384.

As indicated in FIG. 8a, each side section of the complete frame, which may be folded as indicated by the arrows 385, will have the matching cut-out windows 318 and 319, with the transparency held between the cut-outs 285 and 319, which form a pocket therefor. The inside faces 387 of one side of the member T and 344 of the other side of the member T may be provided with a heat fusable surfacing so that when the transparency is inserted and the frame T is closed on the fold line 64, the transparency will be held permanently in position and may be used for instruction, projection or viewing by handling the folded frame T.

It will be noted that the pocket formed between the rectangular cut-outs 287 and 319 is wider at the top and bottom of the transparency and is narrow at the sides of the transparency, so that the transparency will be held flat in its longest dimension.

In the drive arrangement before shown in FIG. 1, the crank 187 for the heat-sealing operation N is driven by the chain 400 from the sprocket 401, with a corresponding sprocket being mounted on the side of the element 187. The belt drive 402 extends over to the pulley 403, which drives the final cutting operation indicated at S.

Upon the end of the drive member 330 will be a sprocket or pulley which will drive the chain or belt 404 and drive the element 250 in the first rectangular cutting operation indicated at Q. From the drive element at 250 the belt or chain 305 will be driven, which drives the pressure rollers 300 and 301. The belt or chain 405 driven from the element 250 will drive the pulley or sprocket 406 on the gear box 407, which in turn will drive the belt or sprocket 408 connected to the rear pulley 409 driving the belt V.

In operation, the entire strip, including the main base strip B and the laminating strip M, will be pulled by the pressure rollers 300 and 301 through the various operations, including the side stripping C, the scoring and partial slitting D, the printing operation G and G', the hole punch P, the marginal heat-seal for the laminating strip M, and the rectangular cut-out operation for the laminating strip at Q. The strip will then be propelled through the final cut-out operation S and deposited upon the belt U and then discharged to a suitable position for usage.

The operation is continuous and, starting with two strips, the frames are slit, scored, printed and die-cut to give the final structure of FIG. 8a. The operation is continuous and is most economical from a labor point of view.

The punching operations will stop the strip and during this operation the feed wheels 300 and 301 will slide on the surface of the strip and the heat due to the sliding will be reduced by means of the blower 319. At position J any excess feed will result in a movement upward of the strip, which will be reduced as soon as the punchers lift and the rollers 300 and 301 continue with the feed.

As many changes could be made in the above machine and process for making frame mountings for transparencies, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed.

What is claimed is:

1. A machine for making foldable transparency mounts comprising in sequence a supply of a continuous paper base strip having an outside face and an inside face, a side cutter for cutting off the side edges of said strip to size correctly the width of the strip, a partial slitter and scoring for partly slitting the strip on outside face and scoring the strip on the inside face, brushes for brushing the faces of the strip, a printer for printing the outside face of the strip, a round puncher for punching small round openings on opposite sides of the strip, one pair being punched for each mount, a supply of continuous laminating stock about one-half the width of the base strip for application to one side of the inside face, a heat applicator to seal the margins of said stock to said inside face, a rectangular punch to punch out a rectangular section in said laminating stock only, a pair of pressure rollers to draw the strip past the preceding operations, a blower to blow upon the strip at said pressure rollers, a double rectangular punch to punch same size rectangular openings each side of smaller size than said laminating stock punch, a cut out to cut off the mounts from the strip, an ejector for the cut off mounts and a conveyor belt to collect and receive the cut off mounts.

2. The machine of claim 1, said paper base strip being substantially thicker than the laminating strip and said laminating strip being sealed at its periphery to said paper base strip so that the cut out therein may be readily ejected and a blower operating through said round openings to remove said cut-out in said laminating stock.

3. The machine of claim 1, said blower at said pressure rollers being positioned to blow up toward the point of contact from below to cool the point of contact and also to remove any debris therefrom.

4. The machine of claim 1, said cut-out being provided with a holder for the cut off mounts, which will cause such mounts to bow downwardly.

5. The machine of claim 1, in which the strip is caused to bow upwardly after the printing operation and before the action of the puncher, heating applicator and rectangular punch.

6. The machine of claim 1, said partial slitter and scorer being provided with means to advance the strip and means to cut any side edges in small sections.

7. The machine of claim 1, said printer elevating the strip above the level of the side cutter, puncher and applicator.

8. The machine of claim 1, said ejector having a depending element for striking the mounts between the portions subjected to the action of the double rectangular punch.

9. The machine of claim 1, a single motor drive having elongated connection to drive the round puncher and elongated connections from such round puncher to operate the other elements on both sides of the round puncher.

References Cited

UNITED STATES PATENTS

| 2,819,656 | 1/1958 | Patterson | 93—1 |
| 2,889,066 | 6/1959 | Alberty | 156—521 X |
| 3,043,363 | 7/1962 | Byers | 156—521 X |

BENJAMIN A. BORCHELT, Primary Examiner

J. M. HANLEY, Assistant Examiner

U.S. Cl. X.R.

156—108, 443